United States Patent Office

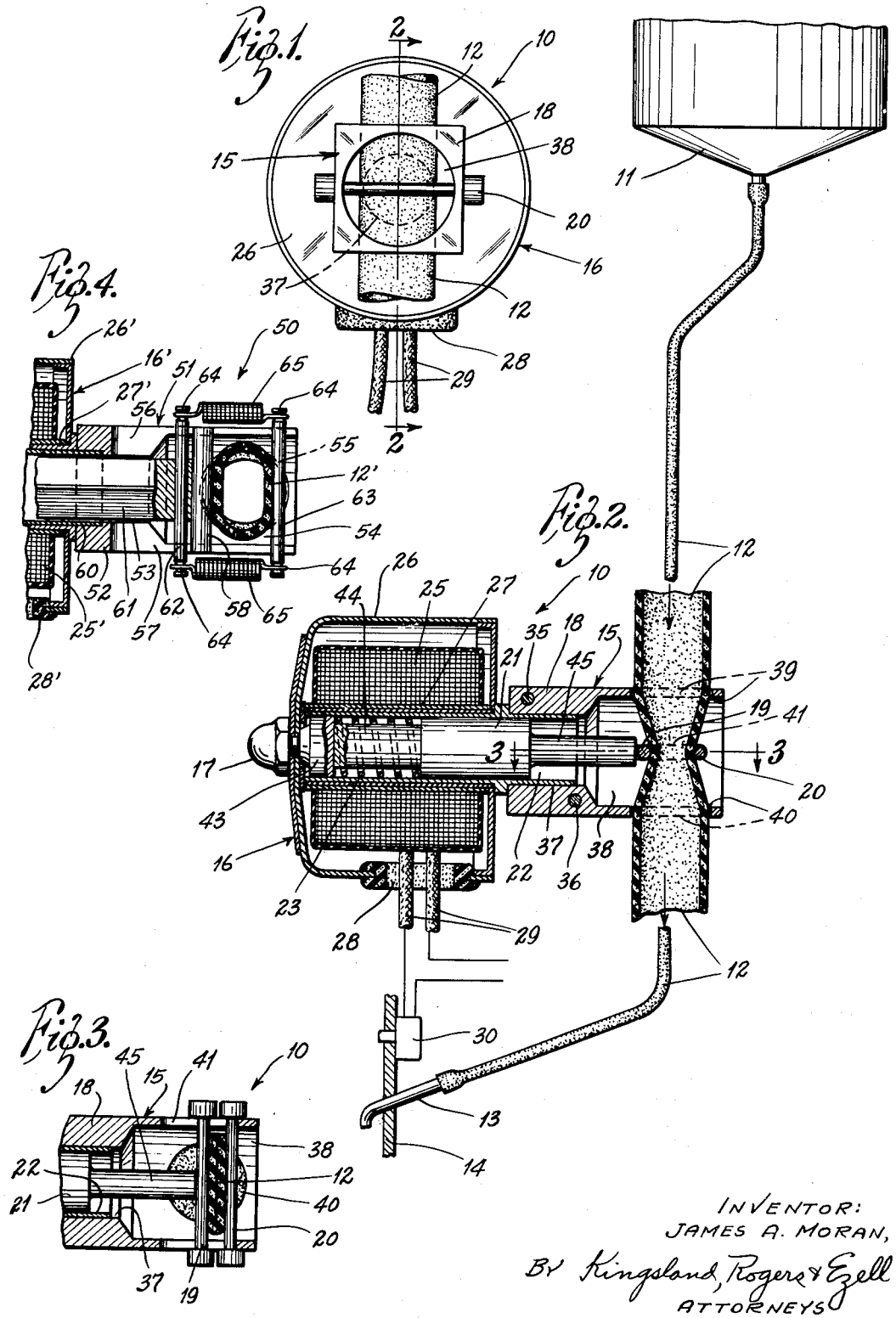

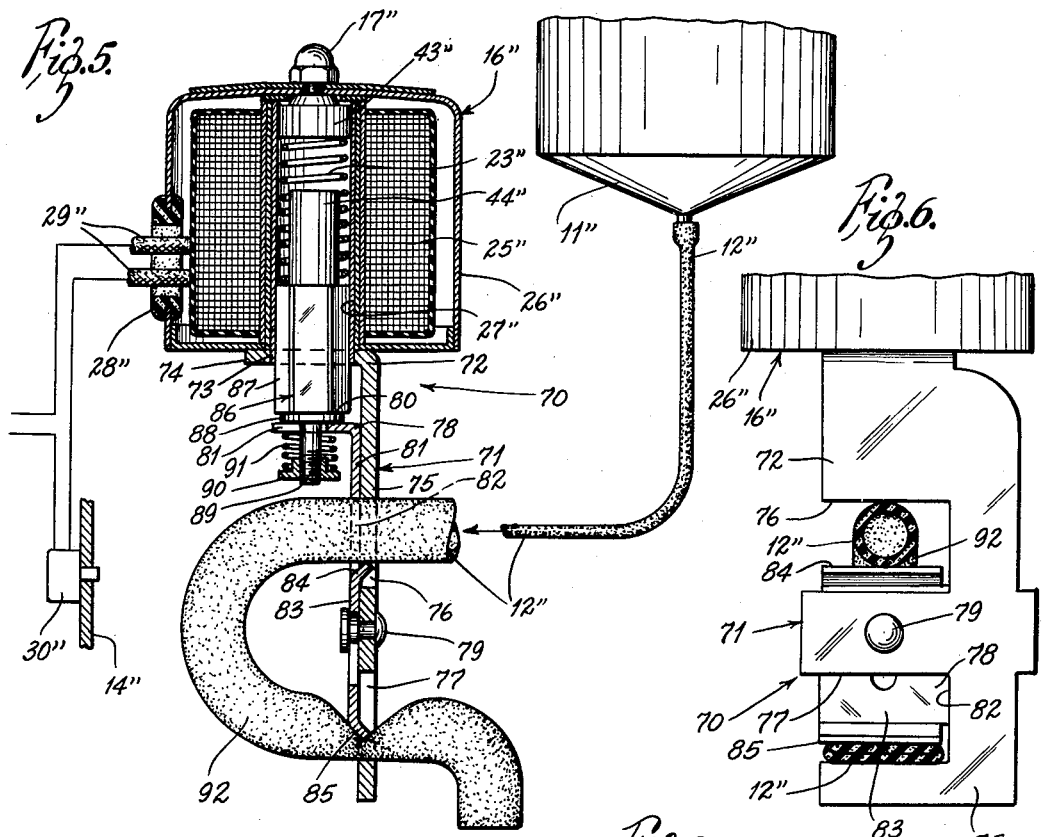

2,726,019
Patented Dec. 6, 1955

2,726,019

DISPENSING SOLENOID VALVE

James A. Moran, St. Louis, Mo., assignor to Alco Valve Company, University City, Mo., a corporation of Missouri Application January 12, 1951, Serial No. 205,643

3 Claims. (Cl. 222—445)

The present invention relates to a dispensing solenoid valve, and more particularly to a dispensing solenoid valve adapted to dispense liquid foods, medicines, and the like.

The need for a dispensing valve of the type contemplated herein is brought about by sanitation requirements and, indeed, by sanitation laws enacted in some places wherein it is required that all handling equipment making normal or probable contact with foods, medicines, and the like, for human consumption be susceptible to frequent and thorough cleaning.

The present invention, embodying features of electrical operation and automatic mechanical shut-off, will provide a heretofore unavailable apparatus complying with such sanitation requirements and is eminently suited to either manual or automatic vending operation.

This invention provides a single flexible tube to conduct the liquid substance to be dispensed, and constricting means entirely external of the tube to regulate flow therethrough. By having the valve body assembly wholly external to the tube, the constricting parts do not need to be always sterile and the tube may be easily removed from the system for complete sterilization.

It is an object of the invention, therefore, to provide a valve of the type described having its dispensing elements susceptible to simple and easy removal for the purpose of thorough cleansing and sterilization.

It is a further object of the invention to provide a valve of the type described having a removable, collapsible, flexible tube for conducting a liquid, and operable means adapted to collapse a portion of the tube to constrain flow therethrough.

It is a still further object of the invention to provide a valve of the type described which is adapted to be operated either manually or automatically.

One modified form of the invention contemplates an arrangement whereby the tube may be constricted at either of two different points along its length, the two actions being mutually exclusive. Thus arranged, the valve includes an inherent ability to dispense accurately measured increments and it is, therefore, another object of the invention to provide a valve of the type described which is adapted to dispense a liquid in predetermined measured increments.

Additional objects and advantages will be apparent from the following description taken in conjunction with the accompanying drawings, in which:

Fig. 1 is an end elevation of a valve constructed in accordance with the teachings of the present invention;

Fig. 2 is a vertical section thereof taken generally along the line 2—2 of Fig. 1, showing the valve in open condition and showing in reduced scale the relative position in respect to the valve of various cooperating elements of a dispensing apparatus;

Fig. 3 is a fragmentary horizontal plan section taken generally along the line 3—3 of Fig. 2, showing the valve in closed condition;

Fig. 4 is a fragmentary horizontal plan section of a modified form of valve constructed in accordance with the teachings of the present invention, showing the valve in open condition;

Fig. 5 is a sectional elevation of another modified form of valve constructed in accordance with the teachings of the present invention, showing the valve in non-dispensing condition and showing in reduced scale the relative positions in respect to the valve of various cooperating elements of a dispensing apparatus;

Fig. 6 is a fragmentary end elevation thereof, the view being taken from the right of Fig. 4;

Fig. 7 is a fragmentary side elevation thereof, partly in section, showing the valve in dispensing condition; and Fig. 8 is a fragmentary end elevation thereof with the tube removed, the view being taken from the left of Fig. 4.

Referring to the drawings more particularly by means of reference numerals and considering first Figs. 1 through 3 thereof, 10 generally indicates one form of dispensing solenoid valve constructed in accordance with the teachings of the present invention. As is clear from Fig. 2, the valve 10 is adapted to control the flow of liquid from a container 11 through a tube 12, the latter constituting an essential element of the valve 10. The outlet end of the tube 12 may be fitted with a delivery spout 13 mounted in a panel 14, it being obvious, however, that neither of the latter elements are requisite to the invention.

The container 11, of appropriate size and transverse section to hold an original quantity of liquid to be incrementally dispensed at intervals, may have an outlet so located in the vertical elevation of the container, and may, itself, be so disposed relative to the delivery spout 13, as to permit the flow by gravity therefrom of all or any predetermined portion of the liquid content. It is clear, however, that appropriate flow may be produced by means other than gravity, such as air pressure, or positive displacement pump.

The tube 12 is constructed of material suited to the type and temperature of the liquid to be dispensed and may, for example, have the properties of being odorless, tasteless, and non-colorific when the dispensed liquid is a food product. Pure amber gum tubing is satisfactory for this purpose. The tube further has a wall structure sufficiently flexible to permit full collapse of the tube under external pressure with consequent complete constriction of the tube; additionally the wall structure is sufficiently resilient to cause the tube to reopen upon the relaxation of such pressure.

The spout 13, appropriately mounted on the panel 14, and to which is attached the lower end of the tube 12, may be of any suitable size, shape and section that will deliver the dispensed liquid in the type of stream desired.

The operating elements of the apparatus as distinguished from the dispensing elements comprise a valve body assembly 15 and an actuating assembly 16, the latter being removably secured to the former by means of an acorn nut 17. The assembly 15 includes a valve body or support 18, two pins 19 and 20, a plunger 21, an enclosing tube 22, and a compression spring 23. The actuating assembly 16 is of well-known construction and includes a solenoid coil 25 disposed in an appropriate housing 26 having a central tubular recess 27 receiving the enclosing tube 22 and having also a grommetted aperture 28 to accommodate electrical leads 29 connected to a suitable power source through a switch 30.

The valve body or support 18 of appropriate external shape, here shown square in Fig. 1, and having holes such as 35 and 36 to provide for mounting to any suitable adjacent structure or bracket has also a cylindrical bore 37 concentric with its longitudinal axis. This bore 37 serves the dual purpose of providing for movement of the plunger 21 within the support 18 and of accommodating one end of the enclosing tube 22 to provide both alignment and secure attachment of the support 18 with the actuating assembly 16. Communicating with the bore 37 and axial thereto, the internal construction of the support 18 expands into an appropriately shaped throat 38, here shown round in Fig. 1. The walls of the throat 38 are pierced by two round holes 39 and 40 diametrically opposite one to the other and having their mutual axis situated normal to the longitudinal axis of the support 18. The size of these holes 39 and 40 is such as to permit the free and easy insertion of the aforementioned tube 12 therethrough. Additionally, the walls of the throat 38 are pierced by two elongated holes or slots 41 and 42, the elongations being parallel to the longitudinal axis of the support 18 and diametrically opposed one to the other, but having the axis of their centers situated 90° from the mutual axis of the round holes 39 and 40.

The pins 19 and 20 are preferably of circular cross section and extend transversely through the aforementioned throat 38, being inserted through the slots 41 and 42 and free to slide parallel to the longitudinal axis of the support 18. Appropriate means, such as the heads shown, are provided to prevent the pins 19 and 20 from falling out of the support 18. It is clear that, inasmuch as the contemplated action of the valve 10 depends only upon movement of the pin 19, the pin 20 may, if desired, be appropriately secured so as to remain permanently in place.

The enclosing tube 22, formed as clearly indicated in Fig. 2, has one end pressed or otherwise appropriately secured in the bore 37 of the support 18, the other end being removably received in the tubular recess 27, as aforementioned, and secured by means of the acorn nut 17 threadedly engaging a plug 43 secured as by pressing or welding, in the solenoid end of the tube 22. The latter thus serves both to maintain the valve 10 in proper assembled alignment and as a guide for movement of the plunger 21.

The compression spring 23 acts against the stationary plug 43 of the enclosing tube 22 to bias the plunger 21 toward the pins 19 and 20 and exerts a force sufficient, in the absence of electromagnetic action of the solenoid 25, to move the pin 19 against the resilient force of the tube 12, thereby to effect complete constriction of the latter between the pins 19 and 20.

The solenoid coil 25, of appropriate design for the service contemplated and having electrical characteristics suited to any desired installation, is capable of sufficient magnetic attraction to retract the plunger 21 to the limit of its travel against the action of the compression spring 23.

The switch 30 may be of any suitable type having electrical characteristics suited to the contemplated installation; an example of suitable type would be a single-throw, normally open push button.

In the operation of the dispensing solenoid valve 10, the several elements may be disposed substantially as shown in Fig. 2 to provide for flow of liquid by gravity from the container 11 through the tube 12 and out of the spout 13 or, as aforementioned, appropriate liquid flow may be induced by mechanical means. It will be observed that the tube 12, in passing through the support 18 or, more specifically, in passing through the throat 38 thereof, passes also between the movable pins 19 and 20. When the apparatus is inactive, that is, when liquid is not being dispensed, the solenoid coil 25 is not energized and the compression spring 23 acts through the plunger 21 to push the pin 19 toward the pin 20, thus collapsing the walls of the tube 12 therebetween and, consequently, constraining flow of liquid. When it is desired to actuate the valve 10 in order to dispense a portion of the liquid from the container 11, the solenoid coil 25 is energized by operating the switch 30, thus causing the plunger 21 to be retracted toward the solenoid coil 25 and relieving the pressure against the pin 19. The latter, being free to move parallel to the longitudinal axis of the support 18, no longer constricts the tube 12 which therefore opens due to the combined forces of its resilient wall construction and of the liquid pressure therewithin, thus permitting flow of liquid past the original point of constriction and out of the delivery spout 13. When the solenoid coil 25 is again deenergized, the spring 23 causes the plunger 21, the pin 19, and the tube 12 to return to their original positions, thus again constraining flow of the liquid.

It is obvious that only the three dispensing elements, that is, the container 11, the tube 12, and the spout 13, can normally come into contact with the liquid to be dispensed. Furthermore, it is obvious that the removal of the tube 12 from the apparatus will render the three dispensing elements free to be individually scrubbed, cleansed and sterilized. The tube 12 may simply and easily be removed by first detaching its ends and then withdrawing it from the support 18. Withdrawal may be facilitated by grasping the heads of the pin 19 with the fingers and moving it against the force of the spring 23 so as to free the tube 12. The apparatus can be quickly reassembled by again separating the pins 19 and 20 in the manner described, threading the tube 12 through the holes 39 and 40 in the support 18 and between the pins 19 and 20, and reattaching the ends of the tube 12 to the other dispensing elements.

A modified form of valve constructed in accordance with the teachings of the present invention is shown as 50 in Fig. 4. It is to be noted that whereas the construction of the previously described valve 10 contemplates constriction of the tube 12 therein upon deenergization of the solenoid coil 25, the valve 50 contemplates a reverse action wherein energization of a similar solenoid coil 25' causes a similar tube 12' to undergo constriction.

Dispensing elements, including the tube 12', for association with the valve 50 may be identical to those for association with the valve 10. Similarly, an actuating assembly 16' may be identical to its counterpart in the valve 10. It will be noted that elements shown in Fig. 4 which may be structurally identical to similar parts in Figs. 1 through 3 are given the same reference numerals distinguished by the addition of a prime.

The valve 50 includes a valve body assembly 51 which is distinctly different from the valve body assembly 15 of the valve 10. Thus, the assembly 51 comprises a valve body or support 52 having any suitable external shape, square for example, and having an axial bore 53 enlarging into a throat 54, the walls of the latter being pierced by two diametrically opposed holes, of which only the hole 55 appears in Fig. 4. Additionally, diametrically opposed slots 56 and 57 are formed in the support 52 so as to extend longitudinally from the throat end thereof well into the walls of the bore 53 as clearly shown in Fig. 4, the central plane of the slots 56 and 57 being disposed at an angle of 90° from the mutual axis of the hole 55 and the hole (not shown) opposite thereto. A stop member 58, which may be tubular in form, is disposed intermediate the ends of the slots 56 and 57 and secured therein, as by pressing, so as to extend transversely through the throat 54.

The external end of the bore 53 is counterbored to accommodate a received and appropriately secured portion of an enclosing tube 60, the opposite end of which is closed by a plug (not shown) identical to the plug 43 of the valve 10, this plug (not shown) being also adapted to cooperate with an acorn nut (not shown) and thus to maintain the assembled relation of the valve body assembly 51 and the actuating assembly 16'.

A plunger 61, preferably having a hexagonal cross section, is disposed so as to be slidable along a mutual axis of the tube 60 and the support 52. It will be noted that the plunger 61 is not required to have a reduced portion such as the portion 44 of the plunger 21 inasmuch as the valve 50 does not include a compression spring corresponding to the spring 23 in the valve 10. Further, as clearly shown in Fig. 4, the valve body end of the plunger 61, rather than being reduced in diameter in the manner of the portion 45 of the plunger 21, has a spring pin 62 disposed transversely therein so as to extend through the slots 56 and 57 of the support 52. The spring pin 62 is appropriately secured in the plunger 61, as by silver soldering, for example, and is obviously movable with the plunger 61 between limits determined by abutment of the latter with the stop member 58 and with the plug (not shown) which closes the solenoid end of the enclosing tube 60.

A thrust pin 63 which may be identical with the spring pin 62 is movably disposed so as to extend through the slots 56 and 57 parallel with the spring pin 62, but on the opposite side of the stop member 58. An annular groove 64 is formed adjacent each end of the pins 62 and 63 to receive the looped ends of a pair of tension springs 65 mounted as clearly shown in Fig. 4. It will be noted that the springs 65 are formed to a predetermined collapsed length so as to maintain a minimum spaced relation of the pins 62 and 63 such that abutment of the plunger 61 with the stop member 58 will cause the thrust pin 63 to be disposed at a predetermined maximum operative distance from the stop member 58. The looped ends of the springs 65 are formed with an inside diameter slightly less than the outside diameter of the pins 62 and 63, being thus retained in the grooves 64.

In the operation of the dispensing solenoid valve 50, the several elements are disposed as shown in Fig. 4, it being noted that the tube 12' is threaded through the throat 54 so as to pass between the stop member 58 and the thrust pin 63. When the solenoid coil 25' is not energized, the normal resilience of the tube 12' plus the liquid pressure therewithin, causes the thrust pin 63 to be moved away from the stop member 58 until the plunger 61 is brought to abutment with the latter. This condition, clearly shown in Fig. 4, permits a flow of liquid through the tube 12'. When it is desired to constrain the flow of liquid, the solenoid coil 25' is energized by appropriate well-known means, thus causing the plunger 61 and the spring pin 62 to be retracted from the position of Fig. 4. It is obvious that this motion will be transmitted through the springs 65 so as to cause the thrust pin 63 to move toward the stop member 58, thus to constrict the tube 12' therebetween. Inasmuch as the maximum travel of the thrust pin 63 is less than that of the plunger 61 and the spring pin 62, there is provided a cushioning action as the springs 65 are caused to extend by continued movement of the plunger 61 after the tube 12' has been fully collapsed between the stop member 58 and the thrust pin 63. This difference in length of travel also insures full closure of the valve 50 without subjecting the tube 12' to the full force of the retracting action of the solenoid coil 25'. Deenergization of the latter obviously permits the valve 60 to revert to the open condition of Fig. 4.

Another modified form of valve constructed in accordance with the teachings of the present invention is shown as 70 in Figs. 5 through 8. It will be noted that elements in the valve 70 which may be structurally identical to similar elements in the valve 10, depicted in Figs. 1–3, are given the same reference numeral distinguished by the addition of a double prime. Thus, it is apparent that the whole of an actuating assembly 16" is identical with the actuating assembly 16 of the valve 10. Similarly, a compression spring 23" may be identical with the compression spring 23.

The valve 70 has a valve body assembly 71 which includes a principal support member 72 mounting one end of an enclosing tube 73, the other end of which is closed by a plug 43", which cooperates with an acorn nut 17" to align and secure the valve body assembly 71 to the actuating assembly 16" in a manner similar to the assembly of the valve 10. The support member 72 includes a horizontal flange portion 74 which receives the enclosing tube 73, and a depending plate-like portion 75 shaped as clearly shown in Fig. 6 which contains two slots 76 and 77. A movable thrust member 78 is slidably retained against a vertical face of the depending portion 75 by means of a shouldered rivet 79, as best shown in Fig. 5. The thrust member 78 has a horizontal flange 80 which contains a slot 81 for a purpose to appear. A depending portion 82 of the thrust member 78 is shaped as clearly shown in Fig. 8 and includes a thrust section 83 having upper and lower flanges 84 and 85 bent, as best shown in Fig. 7, to extend into the slots 76 and 77 of the support member 72.

A plunger 86 having a central portion 87 of hexagonal cross section, is slidably received in the enclosing tube 73 and has an upper portion 44" of reduced cross-sectional area over which the compression spring 23" is disposed so as to bias the plunger 86 toward the support member 72. The lower end of the plunger 86 may be reduced in diameter to form a pad 88, and a further reduced extension 89 extends through the slot 81 in the horizontal portion 80 of the thrust member 78 and threadedly engages a flange nut 90. A compression spring 91 is retained between the flange nut 90 and the lower face of the horizontal flange 80 so as to bias the pad 88 against the upper face of the flange 80.

As clearly shown in Fig. 5, the tube 12" may be threaded through the slots 76 and 77 of the support member 72 so as to form a loop 92 in the tube 12". Thus threaded, the tube 12" passes above the flange 84 and below the flange 85 in a manner to permit constriction of the tube 12" within either the slot 76 or the slot 77, depending upon the position of the thrust section 83. It is clear, however, that constriction of the tube 12" in either of the slots 76 or 77 precludes such a condition in the other of the slots.

In the operation of the dispensing solenoid valve 70, it is clear from Fig. 5 that, when the solenoid coil 25" is deenergized, the compression spring 23" will bias the plunger 86 and the thrust member 78 connected thereto to a position wherein the flange 85 cooperates with the lower portion of the slot 77 to constrict the tube 12" therebetween. As mentioned above, this provides for an open condition in the tube 12" where it passes through the slot 76, and it is obvious that liquid may flow through the tube 12" down to the point of constriction in the slot 77. When the solenoid coil 25" is energized, the plunger 86 is retracted upwardly and causes the thrust member 78 to move upwardly so as to constrict the tube 12" at the point where it passes through the slot 76, and it is apparent that this movement of the thrust member 78 simultaneously provides for the opening of the tube 12" where it passes through the slot 77. It is clear, therefore, that the valve 70 includes an inherent measuring action wherein a liquid is permitted to flow through the tube 12" to the point where it passes through the slot 77, and, upon the solenoid coil 25" being energized, opens the tube 12" at this point and simultaneously closes it at a point thereabove, thereby permitting only the fluid contained in the loop 92 to be dispensed. It is, of course, obvious that the total amount of liquid dispensed during any one cycle of the valve 70 is a function of the size of the loop 92, which clearly may be adjusted to accommodate any desired increment of the total liquid to be dispensed.

Certain applications of the valve 70, such, for example, as those for use with relatively viscous liquids or those utilizing a tube 12" of relatively small diameter, may require the loop 92 to be vented in order to provide a proper flow of liquid into and, subsequently, out of the loop 92. Under such conditions, a small diameter vent tube, such as 93 shown in broken lines in Fig. 7, may be provided to communicate the interior of the loop 92 with the atmosphere. The vent tube 93 will, of course, extend to a height sufficient to prevent overflow therefrom, and may, particularly in the case of certain volatile liquids, lead back to the container 11". Other applications of the valve 70 may be best served by an arrangement in which that portion of the tube 12" forming the loop 92 comprises a tube section of enlarged diameter. Such an arrangement would, aside from improving flow characteristics, provide a larger increment of liquid to be dispensed without undue lengthening of the loop 92.

The versatility of the valve 70 is apparent in that it obviously combines the effects of both the valve 10 and the valve 50. Thus, the valve 70 is well adapted to operate as a multiple valve to control the flow of liquid through a plurality of separate tubes which may or may not be connected to a common supply.

Clearly, there has been described a dispensing solenoid valve, including modifications of a basic form, which, together, fulfill the objects and advantages sought therefor. It is to be understood that the foregoing description and the accompanying drawings have been given only by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. A constricting device for use with a plurality of flexible tubes used in apparatus for dispensing liquids, and the like, comprising a support having a plurality of stationary constricting elements, a thrust member having a plurality of reciprocably movable constricting elements integral with one another, the thrust member being reciprocably associated with the support so as to dispose individual movable constricting elements and individual stationary constricting elements in paired relation wherein the individual movable constricting elements cooperate with the individual stationary constricting elements, means for selectively moving the thrust member simultaneously to effect a constricting relationship of at least one pair of the one or more individual stationary constricting elements with one or more movable constricting elements and to effect a substantially non-constricting relationship of at least one pair of the one or more stationary constricting elements with one or more movable constricting elements.

2. A constricting device for a flexible tube used in apparatus for dispensing liquid, and the like, comprising a support having a first and a second constricting element, a thrust member having a third and a fourth constricting element integrally connected with one another, the thrust member being reciprocably associated with the support so as to dispose the first and third constricting elements and the second and fourth constricting elements in respective cooperative relation, reciprocable means for selectably moving the thrust member alternately to effect a constricting and a substantially non-constricting relationship of the first and third constricting elements and simultaneously alternately to effect a substantially non-constricting and a constricting relationship of the second and fourth constricting elements, said reciprocable means including power operated means to move the thrust member in one direction, and spring means to move the thrust member in an opposite direction.

3. A constricting device for a flexible tube used in apparatus for dispensing liquid, and the like, comprising a support having a first and a second constricting element, a thrust member having a third and a fourth constricting element integrally connected with one another, the thrust member being reciprocably associated with the support so as to dispose the first and third constricting elements and the second and fourth constricting elements in respective cooperative relation, a solenoid coil mounted to the support, a plunger reciprocably movable within the solenoid coil and connected to the thrust member, a first spring means coaxially disposed to and biasing the plunger in a direction to effect a constricting relationship of one only of the pairs of cooperative constricting elements, the solenoid being energizable to effect movement of the plunger in a direction to effect a constricting relationship of the other only of the pairs of cooperative constricting elements, and a second spring means coaxially disposed to and cooperative with the plunger and the thrust member to limit the force of the last mentioned constricting relationship.

References Cited in the file of this patent

UNITED STATES PATENTS

| | | |
|---|---|---|
| 1,742,208 | Hawxhurst | Jan. 7, 1930 |
| 2,129,055 | Gibbs | Sept. 6, 1938 |
| 2,355,232 | Nelson | Aug. 8, 1944 |
| 2,356,212 | Burdett et al. | Aug. 22, 1944 |
| 2,371,434 | Eppler | Mar. 13, 1945 |
| 2,377,261 | Norris | May 29, 1945 |
| 2,387,922 | McBrien | Oct. 30, 1945 |
| 2,387,923 | McBrien | Oct. 30, 1945 |